United States Patent [19]
Sakurai

[11] Patent Number: 5,960,859
[45] Date of Patent: *Oct. 5, 1999

[54] AIR CONDITIONING SYSTEM

[75] Inventor: Hirotaka Sakurai, Isesaki, Japan

[73] Assignee: Sanden Corporation, Gunma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,152

[22] Filed: Aug. 5, 1997

[30] Foreign Application Priority Data

Aug. 9, 1996 [JP] Japan ................................ P08-227491

[51] Int. Cl.⁶ ...................................................... B60H 1/32
[52] U.S. Cl. ................................ 165/43; 62/244; 454/156
[58] Field of Search ........................ 62/244, 515; 165/42, 165/43; 454/456, 121

[56] References Cited

U.S. PATENT DOCUMENTS

| | | |
|---|---|---|
| 1,473,896 | 11/1923 | Wolfe . |
| 1,881,776 | 10/1932 | MacLeod . |
| 1,996,661 | 4/1935 | Tenney . |
| 3,170,509 | 2/1965 | Ress et al. . |
| 3,197,975 | 8/1965 | Boling ........................................ 62/515 |
| 3,252,508 | 5/1966 | Goettl . |
| 3,366,169 | 1/1968 | Laing . |
| 3,415,312 | 12/1968 | Stamm . |
| 3,809,151 | 5/1974 | Scheidel et al. ........................... 62/244 |
| 3,934,642 | 1/1976 | Coulson et al. . |
| 3,948,312 | 4/1976 | Nisbet ....................................... 165/42 |
| 3,983,930 | 10/1976 | Franz . |
| 4,223,720 | 9/1980 | Poirier d'Ange d'Orsay et al. . |
| 4,289,195 | 9/1981 | Bellot et al. . |
| 4,453,591 | 6/1984 | Fehr .......................................... 165/42 |
| 4,513,808 | 4/1985 | Ito et al. . |
| 4,574,873 | 3/1986 | Kawahira et al. . |
| 4,779,672 | 10/1988 | Seikou et al. . |
| 4,815,658 | 3/1989 | Hidemitsu et al. . |
| 4,832,258 | 5/1989 | Hoshino et al. . |
| 4,842,047 | 6/1989 | Sakaruda et al. .......................... 62/244 |
| 4,852,638 | 8/1989 | Hildebrand et al. ....................... 165/42 |
| 4,874,036 | 10/1989 | Masuda . |
| 4,945,977 | 8/1990 | D'Agaro . |
| 5,012,859 | 5/1991 | Nakazawa et al. . |
| 5,590,540 | 1/1997 | Ikeda et al. . |
| 5,701,949 | 12/1997 | Yamaguchi et al. ....................... 165/42 |

FOREIGN PATENT DOCUMENTS

| | | |
|---|---|---|
| 705319 | 11/1930 | France . |
| 1471657 | 3/1966 | France . |
| 552031 | 6/1932 | Germany . |
| 604438 | 10/1934 | Germany . |
| 2815012 | 10/1978 | Germany . |
| 56-34514 | 4/1981 | Japan . |
| 57-26010 | 2/1982 | Japan . |
| 57-121914 | 7/1982 | Japan . |
| 57-182514 | 11/1982 | Japan . |
| 57-182515 | 11/1982 | Japan . |
| 58-224239 | 12/1983 | Japan . |
| 58-224241 | 12/1983 | Japan . |
| 60-35619 | 2/1985 | Japan . |
| 60-113715 | 6/1985 | Japan . |
| 60-255522 | 12/1985 | Japan . |
| 61-150815 | 7/1986 | Japan . |
| 61-202916 | 9/1986 | Japan . |
| 6270654 | 9/1994 | Japan . |
| 8175153 | 7/1996 | Japan . |

*Primary Examiner*—William E. Tapoloai
*Attorney, Agent, or Firm*—Baker & Botts, L.L.P.

[57] ABSTRACT

An air conditioning system for a vehicle passenger compartment comprises a first duct unit including at least one inlet opening and a blower device, and a second duct unit fluidly connected to the first duct unit. The second duct unit includes an evaporator and a heater core, and further includes a damper mechanism and a plurality of outlet openings. An evaporator is disposed forward of the heater core in the second duct unit and forms a part of an air-conditioning circuit. The heater core is disposed rearward of the evaporator and partially covers the second duct unit. The damper mechanism is disposed rearward of the evaporator and controls the amount of air passing through the evaporator and the heater core and introduced to the outlet openings.

The resulting air conditioning system is compact in size and lightweight while simultaneously providing superior air conditioning performance.

17 Claims, 5 Drawing Sheets

AIR CONDITIONING SYSTEM

BACKGROUND OF THE INVENTION

1. Field of the Invention

The present invention generally relates to air conditioning systems, and more particularly, air conditioning systems with improved air distributing mechanisms for use in automotive vehicles.

2. Description of Related Art

Automotive air conditioning systems are known in the art. Generally, automotive air conditioners are provided with an air duct which has an air inlet opening and air outlet openings, and includes a heat exchanger with a plurality of damper elements to control the temperature and passageway of the air.

For example, U.S. Pat. No. 5,590,540 issued to Ikeda et al., which disclosure is incorporated herein by reference, discloses an overall construction of an air conditioning system.

Specifically, referring to FIGS. 1 and 2, air conditioning system 10 comprises three duct units: blower unit 11; cooling unit 12; and heater unit 13. These three duct units are fluidly connected to each other. Each of the units respectively includes the following described components. Blower unit 11 includes blower unit body 11a, blower device 15 and air inlet opening 14. Air inlet opening 14 communicates with the external space and the automobile compartment through a re-circulated air inlet (not shown). Cooling unit 12 includes cooling unit body 12a and evaporator 16. Evaporator 16 is enclosed within cooling unit body 12a and is part of a refrigerant circuit for cooling air passing therethrough. Heater unit 13 includes heater unit body 13a which encloses the main air passageway through heater unit 13, heater core 17 and a plurality of outlets, such as a defroster outlet 22, a footer outlet 23 and a ventilation outlet 24, each of which opens into the automobile compartment.

Air is drawn into blower unit 11 from air inlet opening 14, and ultimately flows out into the automobile compartment through defroster outlet 22, footer outlet 23 and ventilation outlet 24. Normally, air circulation is forced by blower device 15 disposed at the air inlet side of air conditioning system 10. A first damper 25 is disposed adjacent to defroster outlet 22 and ventilation outlet 24 to control the opening and closing of defroster outlet 22 and ventilation outlet 24. A second damper 26 is disposed adjacent to footer outlet 23 to control the opening and closing of footer outlet 23.

Heater core 17 of heater unit 13 is placed downstream from evaporator 16, so as to divide the main passageway through heater unit 13 into two passageways. That is, heater core 17 is placed so as to partly cover the main passageway through heater unit 13 and to form a bypass passageway 31 in heater unit 13. First heater core inlet damper 20 is disposed on the front or inlet side of heater core 17, so that it can cover the heat exchanger area of heater core 17 or close bypass passageway 31. In this manner, bypass passageway 31, through which cooled air passes, is provided in heater unit 13.

Air mixture chamber 30 is located at the rear or outlet side of heater core 17 and functions as an air mixture chamber. In air mixture chamber 30, the portion of air that has passed through heater core 17 and the portion of air that has passed through bypass passageway 31 may be mixed with one another so as to control the temperature of air flowing out into the automobile compartment through at least one of outlets 22, 23 and 24.

Heater unit 13 also includes heater core damper 21 which prevents heater core 17 from being cooled by cooled air flowing from cooling unit 12. Namely, heater core damper 21 covers the rear surface of heater core 17 during the maximum cooling mode of air conditioning system 10.

In the foregoing arrangement, both the cooling unit and the heater unit require space. Additional space is also required where the first inlet heater core damper 20 is disposed and operates. Therefore, the ability to reduce the size and weight of the air conditioning system and make it more compact is limited.

These and other problems with existing air conditioning systems are addressed by embodiments of the present invention.

SUMMARY OF THE INVENTION

Accordingly, it is an object of the present invention to provide an air conditioning system which is compact in size and lightweight.

It is another object of the present invention to provide an air conditioning system which provides superior air conditioning performance.

The present invention is directed to an air conditioning system and to a heater unit in that system. According to the present invention, an air conditioning system for controlling the temperature of a vehicle passenger compartment comprises a first duct unit, or blower unit, and a second duct unit, or heater unit. The first duct unit includes at least one inlet opening and a blower device, such as a fan or other air moving device, for forcing air circulation toward an outlet opening and toward the second duct fluidly connected to the first duct unit. The second duct unit has a forward or upstream end and a rearward or downstream end and a main passageway therethrough. The second duct unit also includes a plurality of outlet openings disposed at the rearward or downstream end thereof An evaporator is disposed in the passageway at the upstream or forward end of the second duct unit and forms a part of an air-conditioning circuit. A heater core is disposed rearward or downstream of said evaporator in the passageway and partially covers the passageway of the second duct unit. A damper mechanism is disposed rearward of the evaporator to control the amount of air passing through the evaporator and heater core and introduced to one or more of the plurality of outlet openings. Specifically, a first damper is preferably disposed rearward of the evaporator for controlling a first amount of air passing through the evaporator and flowing out of one or more of the plurality of outlet openings. A second damper is preferably disposed rearward of the heater core for controlling a second amount of air flowing to one or more of the plurality of the outlet openings.

Further objects, features and other aspects of this invention will be understood from the following detailed description of the preferred embodiments of this invention with reference to the attached drawings.

DESCRIPTION OF PREFERRED EMBODIMENTS

Figure 2:
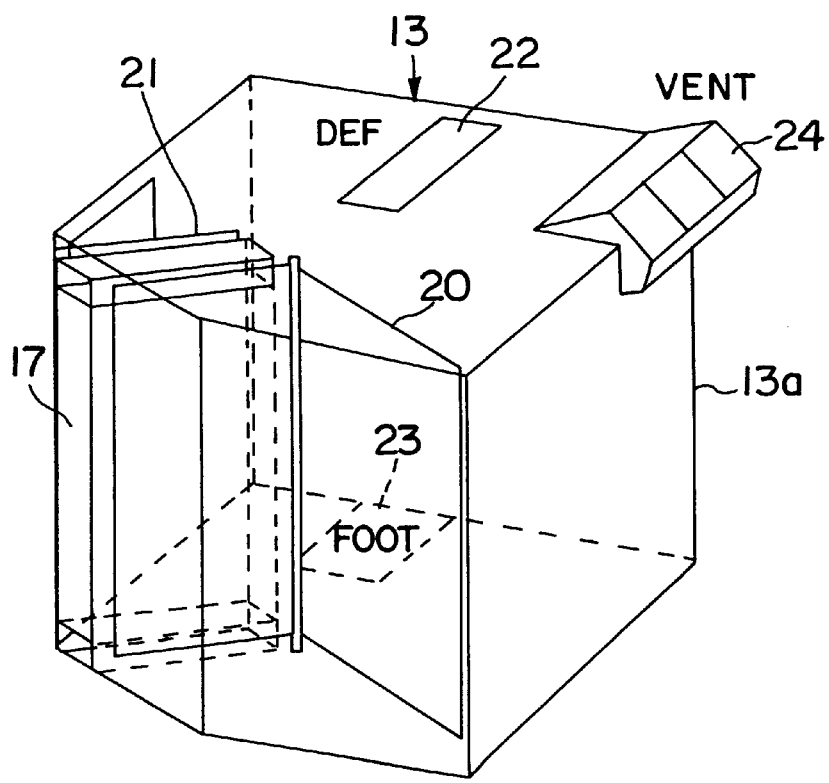
FIG. 2 is a schematic perspective view of a heater unit of a conventional air conditioner system in accordance with the prior art.
Figure 3:
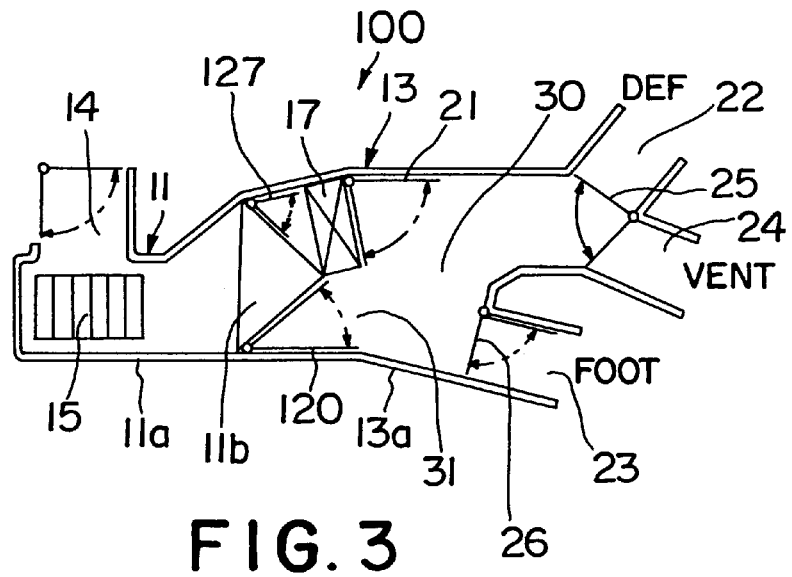
FIG. 3 is a schematic vertical sectional view of an air conditioner system in accordance with a first embodiment of the present invention.
Figure 4:
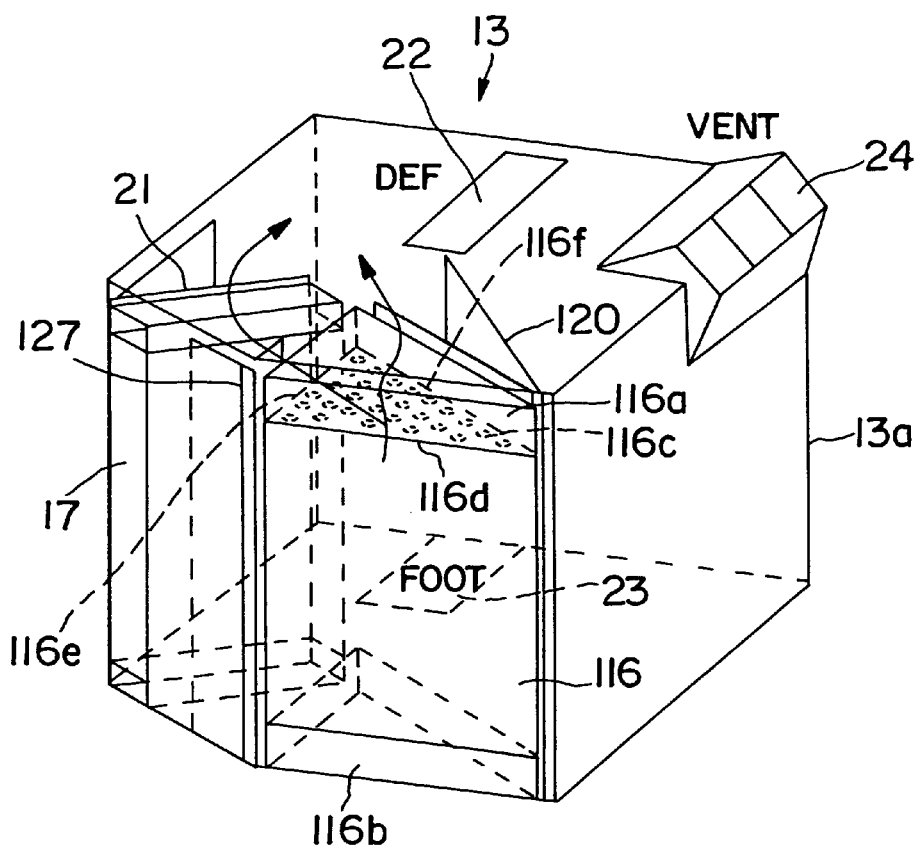
FIG. 4 is a schematic perspective view of a heater unit of an air conditioner system in accordance with the first embodiment of the present invention.
Figure 5:
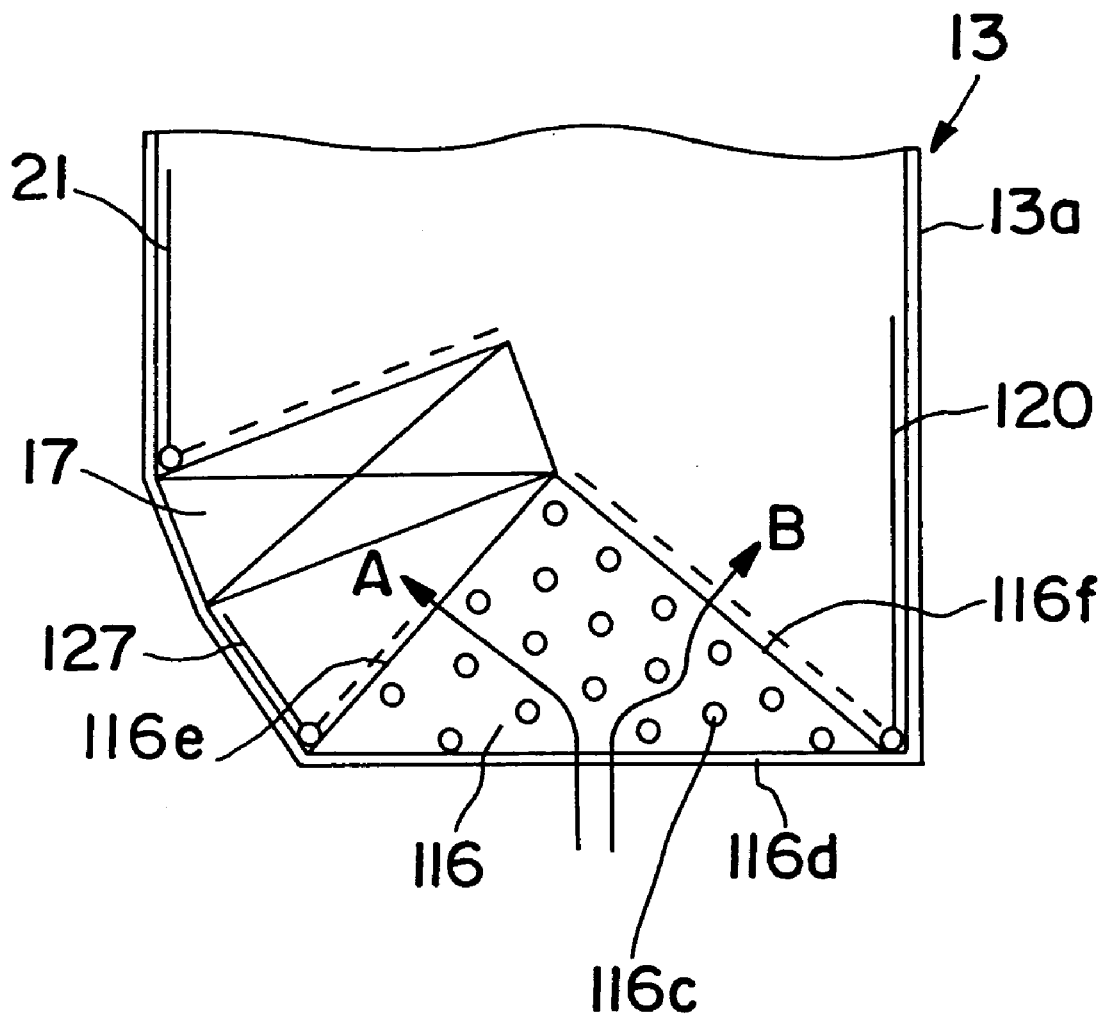
FIG. 5 is a partial schematic vertical sectional view of a heater unit of an air conditioner system in accordance with the first embodiment of the present invention.

FIGS. 3, 4 and 5 depict an automotive air conditioning system in accordance with a first embodiment of the present invention. The air conditioning system is provided with air duct units having air inlet openings, air outlet openings, heat exchangers and a plurality of damper elements for controlling the temperature and passageway of the air. In FIGS. 3–10, like reference numerals are used to denote elements corresponding to those shown in FIGS. 1-2, so that further explanation thereof is omitted.

Air conditioning system 100 includes a first duct unit or blower unit 11 and a second duct unit or heater unit 13. Blower unit 11 has at least one inlet opening and at least one outlet opening and includes a blower device 15 for forcing air circulation toward its outlet opening and toward heater unit 13. Heater unit 13 has a forward or upstream end and a rearward or downstream end. Heater unit 13 is fluidly connected at its upstream end to blower unit 11. Heater unit 13 includes heater unit body 13a, a main passageway enclosed thereby, evaporator 116, heater core 17, a plurality of dampers 120, 21 and 127, and a plurality of outlets at the downstream end, such as a defroster outlet 22, footer outlet 23 and ventilation outlet 24. These outlets all open into the vehicle compartment. Heater core 17 is disposed in the main passageway of heater unit 13, so as to partially cover the main passageway, and form bypass passageway 31. Air mixture chamber 30 is located downstream from heater core 17 and bypass passageway 31.

Evaporator 116 is disposed in the main passageway at the upstream end of heater unit 13, downstream from blower unit 11 and upstream from heater core 17. Evaporator 116 includes upper and lower tanks 116a and 116b, and a plurality of tubes 116c, which are preferably cylindrical, arranged therebetween. Upper and lower tanks 116a and 116b are vertically opposite to each other with a space left in between them. Each of tubes 116c extends vertically and is connected to upper and lower tanks 116a and 116b.

Further, evaporator 116 has substantially a triangular cross section when viewed horizontally or in the direction perpendicular or transverse to tubes 116c. Further, evaporator 116 includes an air intake surface 116d, a first air exhaust surface 116e and a second air exhaust surface 116f, each of which are formed parallel to tubes 116c.

Air intake surface 116d faces toward the open outlet end of blower unit 11 so as to suction or draw in air flow from blower device 15. First air exhaust surface 116e faces the front of the heat exchanger area of heater core 17 so that a first portion of air flow may discharge or flow out to heater core 17. Second air exhaust surface 116f faces toward bypass passageway 31 so that a second portion of air flow, such as cooled air, may flow or be discharged downstream of heater core 17 directly to the outlet openings without passing through heater core 17.

Furthermore, first evaporator damper 120 is disposed on the second air exhaust surface 116f. The amount of air flow flowing into bypass passageway 31 is controlled by regulating the opening of first evaporator damper 120. A second evaporator damper 127 is disposed downstream from evaporator 116 and upstream of heater core 17. The second evaporator damper 127 comprises a plate member which covers approximately half of the area of first air exhaust surface 116e when it closes, in order to partially shut off the cooled air flowing out to heater core 17. Heater core damper 21 is disposed on the rear heat exchanger area of heater core 17 in order to intercept cooled air which has passed through second exhaust surface 116f of evaporator 116.

Referring to FIG. 5, the plurality of tubes 116c of evaporator 116 are arranged so that adjacent rows are zigzag or offset from each other. In other words, the plurality of tubes 116c are arranged such that the portion of the air flow flowing substantially perpendicular to second air exhaust surface 116f strikes at least one of the tubes 116c, and the portion of the air flow flowing substantially perpendicular to first air exhaust surface 116e passes through evaporator 116 without striking the tubes 116c.

As a result, a plurality of air straight air paths "A" are formed in the direction perpendicular to first air exhaust surface 116e, and a plurality of zigzag air paths "B" are formed in the direction perpendicular to second air exhaust surface 116f.

In this configuration, the air flow which is blown from blower device 15 of blower unit 11, flows into the interior of evaporator 116 through air intake surface 116d. It should be noted that evaporator 116, which may also be called a multitubular heat exchanger, has a structure such that any air stream between the upper and lower tanks is substantially free from any constraint and air may be substantially freely changed therebetween.

The air conditioning system 100 operates as follows. All of the air passing through evaporator 116 flows toward and passes through heater core 17 when first evaporator damper 120 is closed and heater core damper 21 and second evaporator damper 127 are opened, i.e., during "maximum heat mode".

All of the air passing through evaporator 116 flows toward bypass passageway 31 without passing through heater core 17 when first evaporator damper 120 is opened, and heater core damper 21 and second evaporator damper 127 are closed, i.e., during "maximum cooling mode".

Furthermore, the portion of air passing through heater core 17 and the portion of air passing through bypass passageway 31 are mixed with one another in air mixture chamber 30 when heater core damper 21 and second evaporator damper 127 are opened and first evaporator damper 120 is partially opened by regulating its opening i.e., during "air mixing mode".

Air conditioning system 100 may also be operated in several operation modes, such as "ventilation mode", "bi-level mode", "foot mode", "foot/defrost mode" and "defrost mode", by regulating first and second dampers 25 and 26 in response to the demand of the passenger in the vehicle.

As a result, the air conditioning system may be as easily operated in the respective operation modes as in existing systems.

Figure 1:
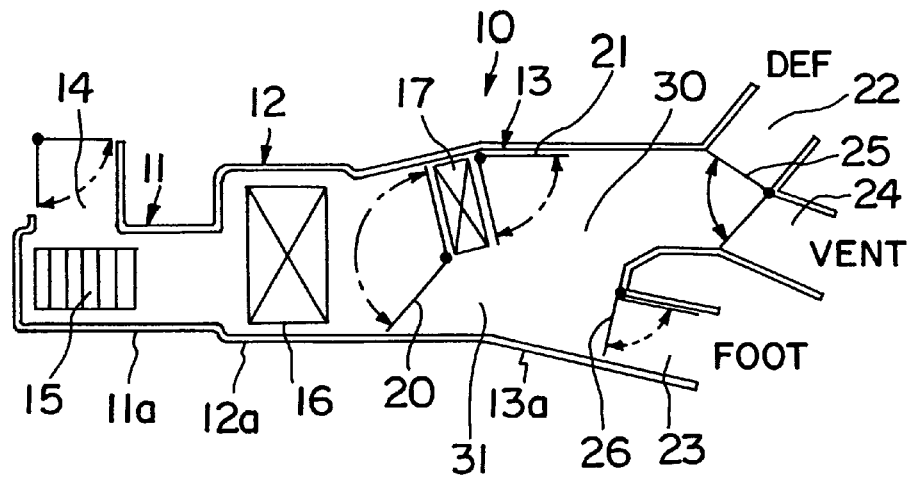
FIG. 1 is a schematic vertical sectional view of a conventional air conditioner system in accordance with the prior art.

In this configuration, evaporator 116 is contained in the main passageway of heater unit 13, i.e., in the space which is occupied by first heater core inlet damper 20 in the system depicted in FIGS. 1 and 2.

Accordingly, the configuration of this embodiment is more compact and reduced in size and weight than existing systems. Simultaneously, the air conditioning system of the present invention is easily controlled with respect to the different operation modes. In other words, the air conditioning system does not need a cooling unit 12 as required in existing systems.

The arrangement of tubes 116c in evaporator 116 also reduces air pressure loss. Such loss may occur as air passes between the plurality of tubes when air flows from evaporator 116 toward heater core 17.

Figure 6:
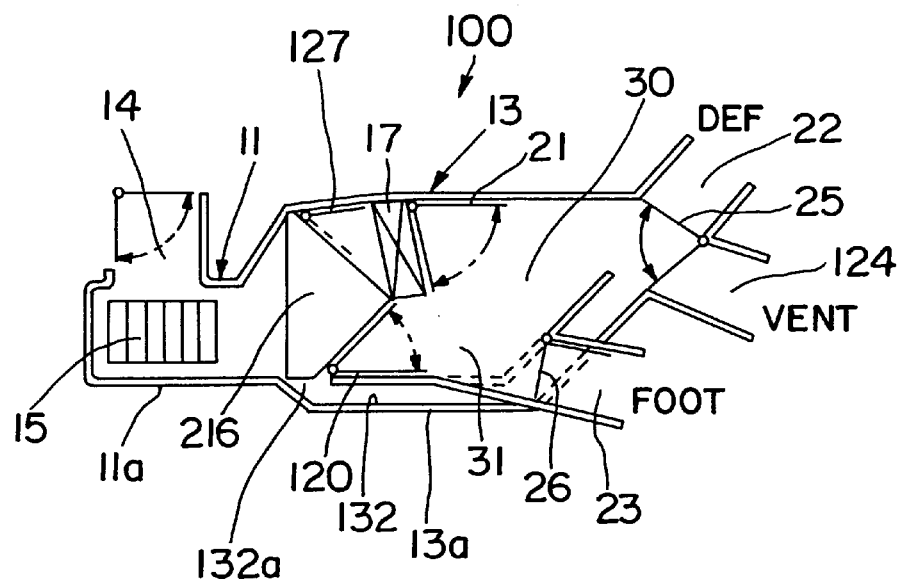
FIG. 6 is a schematic vertical sectional view of an air conditioner system in accordance with a second embodiment of the present invention.
Figure 7:
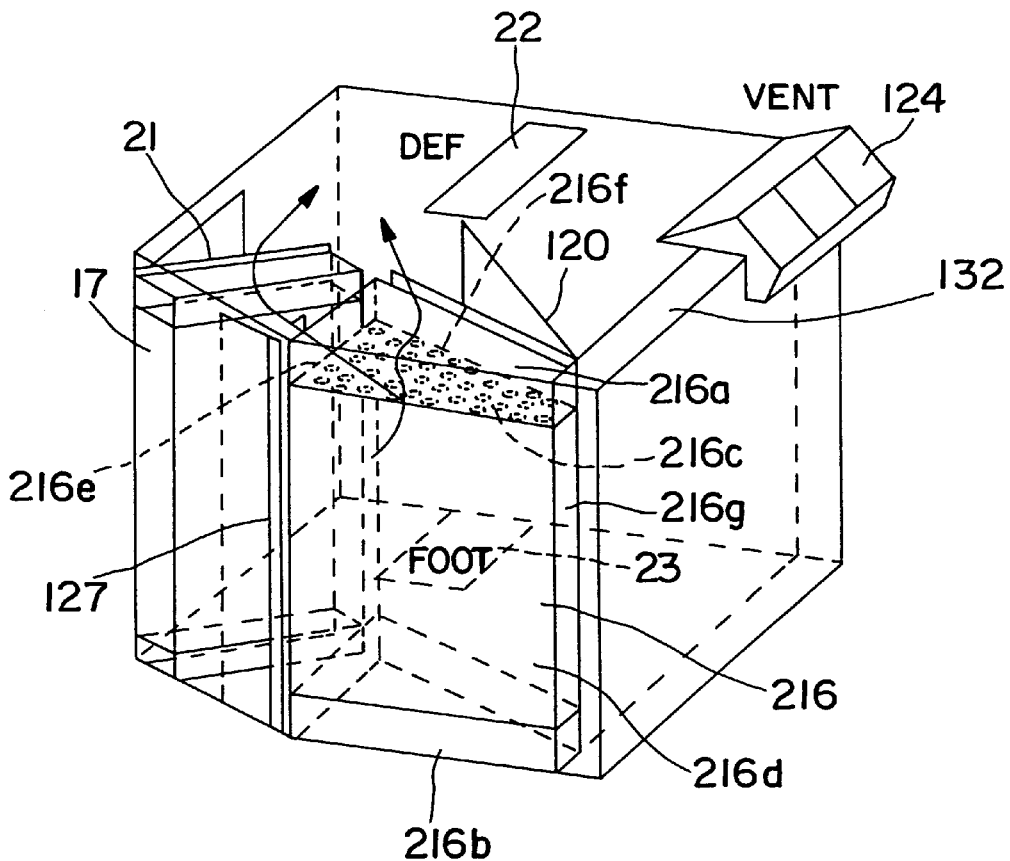
FIG. 7 is a schematic perspective view of a heater unit of an air conditioner system in accordance with the second embodiment of the present invention.
Figure 8:
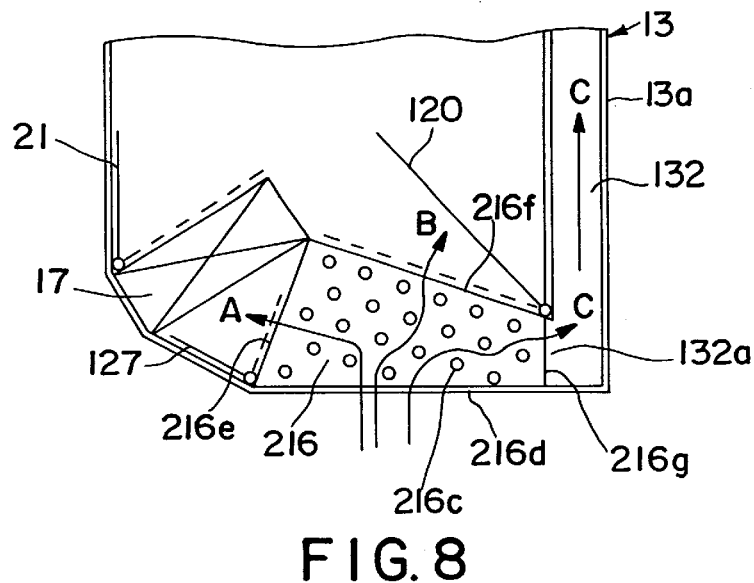
FIG. 8 is a partial schematic vertical sectional view of a heater unit of an air conditioner system in accordance with the second embodiment of the present invention.

FIGS. 6, 7 and 8 depict a second embodiment of the present invention. This embodiment is directed to a modified configuration of air conditioning system 100 of the first embodiment.

In this embodiment, evaporator 216 includes upper and lower tanks 216a and 216b, and a plurality of tubes 216c, which are preferably cylindrical, arranged therebetween similar to the configuration of the first embodiment. Evaporator 216 forms substantially a quadrilateral in the cross section which is horizontal or lies perpendicular or transverse to the row of tubes 216c. Further, evaporator 216 includes an air intake surface 216d, a first air exhaust surface 216e, a second air exhaust surface 216f and third air exhaust surface 216g, each of which are formed parallel to tubes 216c.

Heater unit 13 further includes a cooling bypass passageway 132 formed on the side opposite from and apart from heater core 17. Cooling bypass passageway 132 has a first open end 132a facing toward third air exhaust surface 216g of evaporator 216 and a second open end fluidly connected to ventilation outlet 124.

Thereby, cooling bypass passageway 132 substantially acts to convey the cooled air "C", which is cooled through evaporator 216, directly to ventilation outlet 124 without mixing with the heated air heated by heater core 17, when in the bi-level mode.

Accordingly, this configuration has a desirable and ideal bi-level mode while simultaneously having the same advantages as those in the first embodiment.

Figure 9:
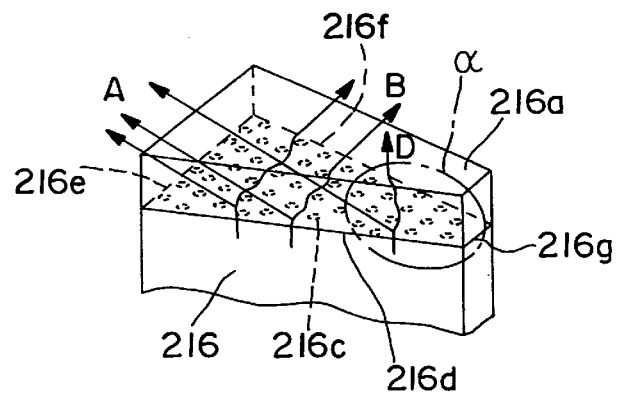
FIG. 9 is a schematic perspective view of an evaporator of an air conditioner system in accordance with a third embodiment of the present invention.
Figure 10:
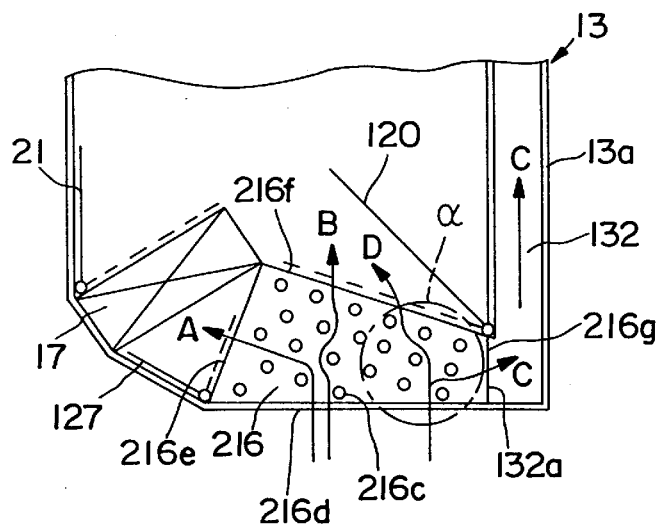
FIG. 10 is a partial schematic vertical sectional view of a heater unit of an air conditioner system in accordance with the third embodiment of the present invention.

FIGS. 9 and 10 depict a third embodiment of the present invention. The embodiment is directed to a modified configuration of the air conditioning system of the second embodiment.

As depicted in FIGS. 9 and 10, this embodiment has an area "α" in the row of tubes 216c adjacent to first open and 132a of cooling bypass passageway 132. This area is arranged differently from the other area of the row of tubes. Namely, tubes 216c in area "α" are arranged such that the portion of air flow "D", flowing in evaporator 216 and to a surface slightly inclined with respect to second air exhaust surface 216f, strikes at least one tube 216c. Tubes 216c are aligned in rows the same as the alignment of the second embodiment of the present invention except in the area "α".

First evaporator damper 120 is controlled by placing it at the angle created between second air exhaust surface 216f of evaporator 216 and the inner wall of cooling bypass passageway 132 of heater unit 13. Namely, first evaporator damper 120 guides the portion of air passed through area "α" to advance in a direction which is oblique to first air exhaust surface 216e as shown in FIGS. 9 and 10.

As a result, the heat exchange from tubes 216c is more efficient as the air passes through the different areas of evaporator 216.

In this third arrangement, substantially the same advantages as those in the first and second embodiments can be obtained. Furthermore, this embodiment increases the heat-exchange efficiency of evaporator 216 even more.

Although the present invention has been described in connection with the preferred embodiments, the invention is not limited thereto. It will be easily understood by those of ordinary skill in the art that variations and modifications can be easily made within the scope of this invention as defined by the following claims.

I claim:

1. An air conditioning system for controlling the temperature of a vehicle passenger compartment, said air conditioning system comprising:

a first duct unit including a blower device; and a second duct unit fluidly connected to said first duct unit, said blower device forcing air circulation from said first duct unit toward said second duct unit, said second duct unit comprising:

a forward end and a rearward end;

a passageway therethrough;

a plurality of outlet openings disposed at the rearward end thereof;

an evaporator disposed in said passageway at the forward end of the second duct unit, said evaporator comprising an exhaust surface and forming a part of an air-conditioning circuit;

a heater core disposed in said passageway of said second duct unit rearward of said evaporator and partially covering said passageway of said second duct unit; and a damper mechanism disposed rearward of said evaporator so as to control an amount of air passing through said evaporator and said heater core and introduced to one or more of said plurality of outlet openings, said mechanism comprising a first damper 120, said first damper having a closed position whereby all air flow passes through said heater core solely by placing said first damper in said closed position, a second damper 21, said second damper having a closed position whereby all air flow through said heater core is prevented solely by placing said second damper in said closed position, and a third damper 127, said third damper having a closed position whereby said third damper covers a portion of said exhaust surface of said evaporator to partially shut off air flowing to said heater core when said third damper is in said closed position.

2. The air conditioning system of claim 1, wherein said first damper is disposed rearward of said evaporator for controlling a first amount of air flowing to said one or more of said plurality of outlet openings and said second damper is disposed rearward of said heater core for controlling a second amount of air flowing through said heater core to said one or more of said plurality of outlet openings.

3. The air conditioning system of claim 1, wherein said evaporator includes an upper tank and a lower tank, and a plurality of tubes fluidly connected to said upper and lower tanks.

4. The air conditioning system of claim 1, wherein said second duct unit further includes a cooling bypass passageway formed apart from said heater core for directly introducing an air flow passed through said evaporator to at least one of said plurality of outlet openings.

5. The air conditioning system of claim 1 wherein said plurality of outlet openings comprise an upper outlet opening, a defrost outlet opening and a lower outlet opening.

6. An air conditioning system for controlling the temperature of a vehicle passenger compartment, said air conditioning system comprising:

a first duct unit including a blower device; and a second duct unit fluidly connected to said first duct unit, said blower device forcing air circulation from said first duct unit toward said second duct unit, said second duct unit comprising:

a forward end and a rearward end;

a passageway therethrough;

a plurality of outlet openings disposed at the rearward end thereof;

an evaporator disposed in said passageway at the forward end of the second duct unit, said evaporator forming a part of an air-conditioning circuit;

a heater core disposed in said passageway of said second duct unit rearward of said evaporator and partially covering said passageway of said second duct unit; and a damper mechanism disposed rearward of said evaporator so as to control an amount of air passing through said evaporator and said heater core and introduced to one or more of said plurality of outlet openings, wherein said evaporator includes an upper tank, a lower tank, and a plurality of tubes fluidly connected to said upper and lower tanks, and wherein said evaporator further includes an intake surface for sectioning an air flow, a first exhaust surface for discharging first portion of said air flow toward said heater core and a second exhaust surface for discharging a second portion of said air flow to said one or more of said plurality of outlet openings by bypassing said heater core.

7. The air conditioning system of claim 6, wherein said plurality of tubes are aligned in a row so that at least a portion of said air flow which is substantially perpendicular to said first exhaust surface passes through said evaporator without striking any of said tubes.

8. The air conditioning system of claim 6, wherein a part of said plurality of tubes are aligned in a row so that at least a portion of said air flow in said evaporator which is oblique to said first exhaust surface strikes at least one of said tubes.

9. A heater unit for air conditioning system, said system including a blower unit fluidly connected to said heater unit, said blower unit having blower device for forcing air circulation toward said heater unit, said heater unit comprising:

an upstream end and a downstream end;

a body having a passageway therethrough;

a plurality of outlet openings disposed at the downstream end thereof;

an evaporator disposed in the passageway at the upstream end, said evaporator comprising an exhaust surface;

a heater core disposed downstream from said evaporator so as to partially cover the passageway through said heater unit; and a damper mechanism disposed downstream from said evaporator so as to control an amount of air passing through said evaporator and said heater core and introduced to one or more of said plurality of outlet openings, said mechanism comprising a first damper, said first damper having a closed position whereby all air flow passes through said heater core solely by placing said first damper in said closed position, a second damper, said second damper having a closed position whereby all air flow through said heater core is prevented solely by placing said second damper in said closed position, and a third damper, said third damper having a closed position whereby said third damper covers a portion of said exhaust surface of said evaporator to partially shut off air flowing to said heater core when said third damper is in said closed position.

10. The heater unit of claim 9, wherein said heater unit further includes a bypass passageway formed in said heater unit for bypassing said heater core, and a mixture chamber disposed downstream from said heater core and said bypass passageway.

11. The heater unit of claim 10, wherein said first damper is disposed downstream from said evaporator for controlling a first amount of air flowing out said bypass passageway and said heater core into said mixture chamber, and said second damper is disposed downstream from said heater core for controlling a second amount of air flowing through said heater core into said mixture chamber.

12. The heater unit of claim 9, wherein said evaporator includes an upper tank, a lower tank and a plurality of tubes fluidly connected to said upper and lower tanks.

13. The heater unit of claim 9, wherein said heater unit further includes a cooling bypass passageway formed apart from said heater core for directly introducing an air flow passed through said evaporator to at least one of said plurality of outlet openings.

14. The heater unit of claim 9, wherein said plurality of outlet openings comprise an upper outlet opening, a defrost outlet opening and a lower outlet opening.

15. A heater unit for air conditioning system, said system including a blower unit fluidly connected to said heater unit, said blower unit having blower device for forcing air circulation toward said heater unit, said heater unit comprising:

an upstream end and a downstream end;

a body having a passageway therethrough;

a plurality of outlet openings disposed at the downstream end thereof;

an evaporator disposed in the passageway at the upstream end;

a heater core disposed downstream from said evaporator so as to partially cover the passageway through said heater unit; and a damper mechanism disposed downstream from said evaporator so as to control an amount of air passing through said evaporator and said heater core and introduced to one or more of said plurality of outlet openings, wherein said evaporator includes an upper tank, a lower tank and a plurality of tubes fluidly connected to said upper and lower tanks, and wherein said evaporator further includes an intake surface for sectioning an air flow, a first exhaust surface for discharging a first portion of said air flow toward said heater core and a second exhaust surface for discharging a second portion of said air flow to said one or more of said plurality of outlet openings by bypassing said heater core.

16. The heater unit of claim 15, wherein said plurality of tubes are aligned in a row so that at least a portion of the air flow which is substantially perpendicular to said first exhaust surface passes through said evaporator without striking any of said tubes.

17. The heater unit of claim 16, wherein a part of said plurality of tubes are aligned in a row so that at least a portion of the air flow in said evaporator which is oblique to said first exhaust surface of said evaporator strikes at least one of said tubes.

* * * * *